(12) United States Patent
Li et al.

(10) Patent No.: US 12,517,256 B2
(45) Date of Patent: Jan. 6, 2026

(54) LIDAR ASSEMBLY FOR AUTOMOTIVE APPLICATIONS COMPRISING AN ANTI REFLECTION UNIT

(71) Applicant: AGC GLASS EUROPE, Louvain-la-neuve (BE)

(72) Inventors: Meijie Li, Louvain-la-neuve (BE); Yannick Sartenaer, Vedrin (BE); Fabien Descamps, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 1042 days.

(21) Appl. No.: 17/600,815

(22) PCT Filed: Apr. 3, 2020

(86) PCT No.: PCT/EP2020/059515
§ 371 (c)(1),
(2) Date: Oct. 1, 2021

(87) PCT Pub. No.: WO2020/201489
PCT Pub. Date: Oct. 8, 2020

(65) Prior Publication Data
US 2022/0196843 A1   Jun. 23, 2022

(30) Foreign Application Priority Data

Apr. 5, 2019   (EP) .................................... 19167511

(51) Int. Cl.
*G01S 17/93*   (2020.01)
*G01S 17/931*  (2020.01)
*B60R 11/00*   (2006.01)

(52) U.S. Cl.
CPC ............. *G01S 17/931* (2020.01); *B60R 11/00* (2013.01); *B60R 2011/0026* (2013.01)

(58) Field of Classification Search
None
See application file for complete search history.

(56) References Cited

U.S. PATENT DOCUMENTS

| | | | | |
|---|---|---|---|---|
| 4,701,613 A | * | 10/1987 | Watanabe | B60S 1/0888 |
| | | | | 250/227.24 |
| 6,919,961 B2 | * | 7/2005 | Tsunetomo | B60S 1/0818 |
| | | | | 250/227.25 |

(Continued)

FOREIGN PATENT DOCUMENTS

| | | |
|---|---|---|
| CA | 3 042 473 A1 | 5/2018 |
| EP | 3 316 000 A1 | 5/2018 |

OTHER PUBLICATIONS

International Search Report issued on Jul. 2, 2020 in PCT/EP2020/059515 filed on Apr. 3, 2020.

*Primary Examiner* — Hovhannes Baghdasaryan
(74) *Attorney, Agent, or Firm* — Oblon, McClelland, Maier & Neustadt, L.L.P.

(57) ABSTRACT

An automotive vehicle having (a) a pane with a refractive index, n1, (b) a Light Detection and Ranging (LiDAR) device located in the interior environment and facing the inner surface of the pane, and (c) an anti-reflection unit, made of a material of refractive index, n3, coupling the LiDAR device to the inner surface of the transparent pane, and having a mean absorption coefficient (k) in the wavelength range from 750 nm to 1650 nm lower than 5 m$^{-1}$ (i.e., k≤5 m$^{-1}$). The anti-reflection unit also has an interfacial surface coupled in intimate contact with the inner surface of the transparent pane and a surface coupled to the LiDAR device, forming the angle θ with the interfacial surface and which normal forms the angle φ, with the incident axis (i0), where φ is between −30° and +30°.

20 Claims, 5 Drawing Sheets

(56) References Cited

U.S. PATENT DOCUMENTS 10,531,075 B1 * 1/2020 Dariush ................ G01S 17/931
2019/0263315 A1 8/2019 Melcher et al.

* cited by examiner $n0 \sin \varphi = n3 \sin \phi$
$n3 \sin \phi = n1 \sin \beta$
$n1 \sin \beta = n0 \sin \alpha$ $n0 \sin \varphi = n3 \sin \phi$
$n3 \sin \tau = n1 \sin \beta$
$n1 \sin \beta = n0 \sin \alpha$ $\sin \alpha = (n3/n0) \sin \theta$

LIDAR ASSEMBLY FOR AUTOMOTIVE APPLICATIONS COMPRISING AN ANTI REFLECTION UNIT

TECHNICAL FIELD

The present invention is in the field of detection devices suitable for use in automotive vehicles to assist a driver (ADAS=Advanced Driver Assistance System), including autonomous or self-driving vehicles. More particularly, the present invention concerns a LiDAR device facing an inner surface of a pane, the pane may be transparent such as a windscreen or sidelight, backlight or an opaque pane such as used for car pillars. The LiDAR forms an angle α1 with the vertical. The present invention reduces the fraction of infrared radiation emitted by the LiDAR device and more particularly a new generation of Lidar such as solid-state LiDAR device which is reflected upon crossing the inner surface of the pane (transparent or opaque).

BACKGROUND OF THE INVENTION

Automotive vehicles are being equipped by more and more systems for assisting a driver of a vehicle. These are collectively referred to as ADAS (=Advanced Driver Assistance System). ADAS comprise detection systems able to detect and, in some cases, identify an obstacle in the immediate surrounding of the vehicle. For example, detection systems include optical or IR-cameras, radars, and LiDARs (=light detection and ranging).

In general, a LiDAR device is an optoelectronic system which is composed of several major components: (1) at least a laser transmitter (=light source). It is preferred that the laser transmitter of the LiDAR sensing device of the present invention transmits principally in infrared wavelength from 700 nm to 1 mm, preferably in the near infrared wavelength 780 nm to 3 μm, more preferably in the wavelength range from 750 to 1650 nm; (2) at least a receiver (=light detection element) which receives and converts the light into an electrical signal; and an electronic processing chain signal that extracts the information sought.

LiDAR sensing devices which are mounted on mobile platforms such as airplanes or satellites, may further require instrumentation to determine their absolute position and orientation and therefore further include a position and/or navigation system.

Preferably, the LiDAR device to be used in the present invention, is a new generation LiDAR device based on solid state LiDAR as a flashing LiDAR. The scanning or rotating LiDARs are using moving lasers beams while flashing and solid state LiDAR emits light pulses which reflect off objects.

LiDARs are being implemented more and more in automotive vehicles. They can be mounted on an exterior of an automotive vehicle which is a very aggressive environment exposed to rain, hail, large temperature variations, and impacts with various objects including gravel. To protect LiDARs from such environment, researches are done to integrate LiDAR devices behind an existing transparent or opaque pane of the vehicle, such as a windscreen, backlite, sidelite or pillars.

LiDARs can use UV-, visible, or IR-light. LiDARs used in the automotive industry, however, generally emit light in the near infrared spectrum comprised between 750 and 1650 nm. The pane portion facing a LiDAR device must therefore maintain a high transmittance to the near infrared light emitted by the LiDAR device.

As illustrated in FIG. 6, because of aerodynamics considerations, at least windscreens and front light covers of many of today automotive vehicles are strongly sloped and form a tilting angle α1 with the vertical of at least 10°, and often at least 50" and more. If the near infrared beam emitted by the LiDAR device is to propagate centred on a refracted axis (ir) which forms an angle α with a normal to an external surface of the transparent pane, the near infrared beam emitted by the LiDAR device would propagate centred on an incident axis (i0) intersecting the inner surface of the transparent pane with the same angle α. As illustrated in FIG. 2, if the refracted axis (ir) is horizontal, then the angle α=α1, and can reach values of the order of 60 to 70° depending on the design of the vehicle.

As illustrated in FIG. 1(a), an incident radiation propagating along an incident axis (i0) before traversing a transparent wall portion (1) can be split into one or more of a reflected radiation (irf), an absorbed radiation (ia), a scattered radiation (is), and a refracted radiation (if). The reflected radiation (irf) and absorbed radiation (ia) do not traverse the transparent wall portion. As illustrated in FIG. 1(e), according to Fresnel Law, the fraction (irf) of a radiation reflected upon intersecting a surface of the transparent wall portion (1) increases with the incident angle φ the incident axis (i0) forms with the surface. FIG. 1(e) illustrates graphically Fresnel law, showing the reflectance as a function of the incident angle φ, increasing continuously, and very steeply for incident angles greater than 50°. Schlick proposed an approximation to Fresnel law, wherein the reflectance R(φ) increases with the $5^{th}$ power of (1−cos φ).

With LiDAR devices positioned behind a pane and more particularly a visible light transparent pane and emitting an infrared radiation intersecting the transparent pane with an incident angle φ (=α) greater than 50° (cf. FIG. 2), the fraction of the radiation which is reflected on the inner surface of the pane becomes very large (cf. FIG. 1(e)).

To reduce the amount of light reflected off an inner surface of a pane, anti-reflective coatings may be currently applied to the inner surface. This solution has, however, a number of drawbacks. Standard anti-reflective coatings are normally optimized for normal incidence (i.e., incident angle φ=0). The performance of such anti-reflective coatings drops with increased incident angles φ. Specially designed anti-reflective coatings can be optimized for larger values of the incident angle φ, but the design can be more complicated and challenging. In particular, since LiDAR devices and more particularly solid-state LiDAR devices cover a broad field of view (FOV), illustrated in FIG. 4 as a cone centred on the incident axis (i0), the cone spanning incident angles ranging between φn and φm. Taking the field of vision of a LiDAR into consideration renders the design of such specific anti-reflective coatings much more difficult and less efficient. Furthermore, applying an anti-reflective coating involves additional production costs and may affect the mechanical, chemical or thermal resistance of the transparent pane.

With the evolution of the ADAS and of the autonomous vehicles requiring a multitude of detection systems, it is not acceptable having to increase the power of the LiDAR devices mounted in the interior of an automotive vehicle to overcome the intensity losses in infrared radiations due to reflection against the inner surface of a transparent pane as this would increase the production cost and vehicle energy consumption to unacceptable levels. The present invention proposes a solution for reducing the fraction of a radiation emitted by a LiDAR, which is reflected on the inner surface of a transparent pane having a predefined slope. This and other advantages are described in more details in the following sections.

SUMMARY OF THE INVENTION

The present invention is defined in the appended independent claims. Preferred embodiments are defined in the dependent claims. In particular, the present invention concerns an automotive vehicle comprising:

(a) a pane having a refractive index, n1, and
comprising an inner surface facing an interior environment and an outer surface facing an exterior environment,
having at least one portion having mean absorption coefficient (k) in the wavelength range from 750 nm to 1650 nm lower than 5 m$^{-1}$ (i.e., a≤5 m$^{-1}$), and wherein
the inner surface (1$i$) of the transparent pane (1) forms a tilting angle α1 with a vertical direction larger than 10° (α1>10°),
(b) a Light Detection and Ranging (LiDAR) device located in the interior environment and facing the inner surface, configured for emitting an IR beam centred on an incident axis (i0) forming an angle (φ+θ) with a normal to the inner surface (1$i$), passing through the transparent pane (1), and propagating in the exterior environment along a trajectory centred on a refracted axis (ir) forming an angle α with a normal to the outer surface (1$o$).

According to the present invention, the automotive vehicle further comprises an anti-reflection unit (3),
made of a material of refractive index, n3, coupling the LiDAR device to the inner surface of the transparent pane,
having a mean absorption coefficient (k) in the wavelength range from 750 nm to 1650 nm lower than 5 m$^{-1}$ (i.e., k≤5 m$^{-1}$),
comprising an interfacial surface coupled in intimate contact with the inner surface of the transparent pane and
comprising a surface coupled to the LiDAR device, forming the angle θ with the interfacial surface (31) and whose normal forms the angle φ, with the incident axis (i0), wherein φ is comprised between −30° and +30°.

According to the present invention, the term "at least one portion having a mean absorption coefficient (k) in the wavelength range from 750 nm to 1650 nm lower than 5 m$^{-1}$ (i.e., k<5 m$^{-1}$), preferably lower than 3 m$^{-1}$ (i.e., k<3 m$^{-1}$), more preferably lower than 1 m$^{-1}$ (i.e., k<1 m$^{-1}$)" is also called an "IR-transparent portion" or IR-transparent pane when all the surface of the pane has this properties.

According to the present invention, the LiDAR device is placed behind the at least one portion having a mean absorption coefficient (k) in the wavelength range from 750 nm to 1650 nm lower than 5 m$^{-1}$ (i.e., k<5 m$^{-1}$), preferably lower than 3 m$^{-1}$ (i.e., k<3 m$^{-1}$), more preferably lower than 1 m$^{-1}$ (i.e., k<1 m$^{-1}$).

According to one embodiment of the present invention, the pane is a glass pane.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 3A:
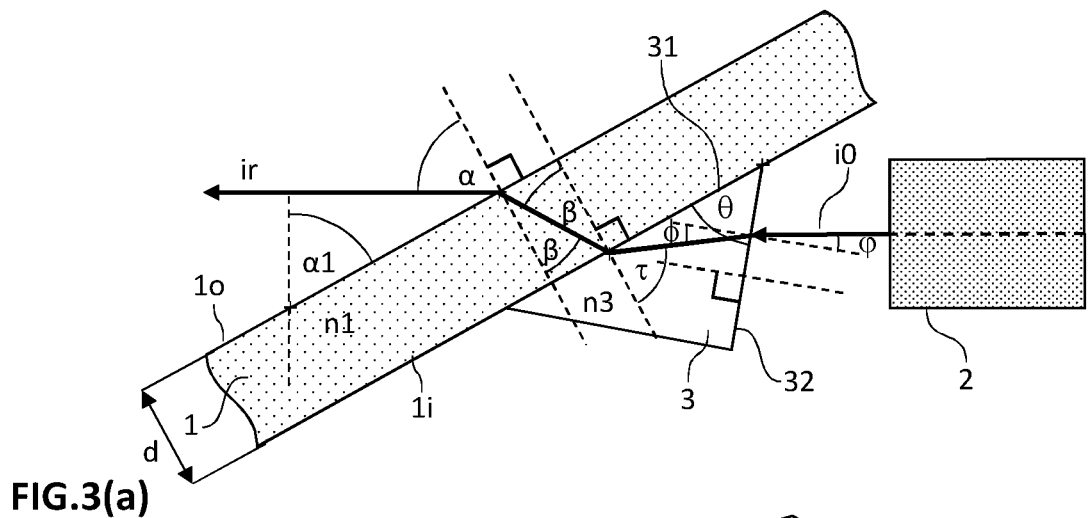
FIG. 3: shows various embodiments of an interior of an automotive vehicle provided with an assembly of a LiDAR device according to one embodiment of the present invention.
Figure 3B:
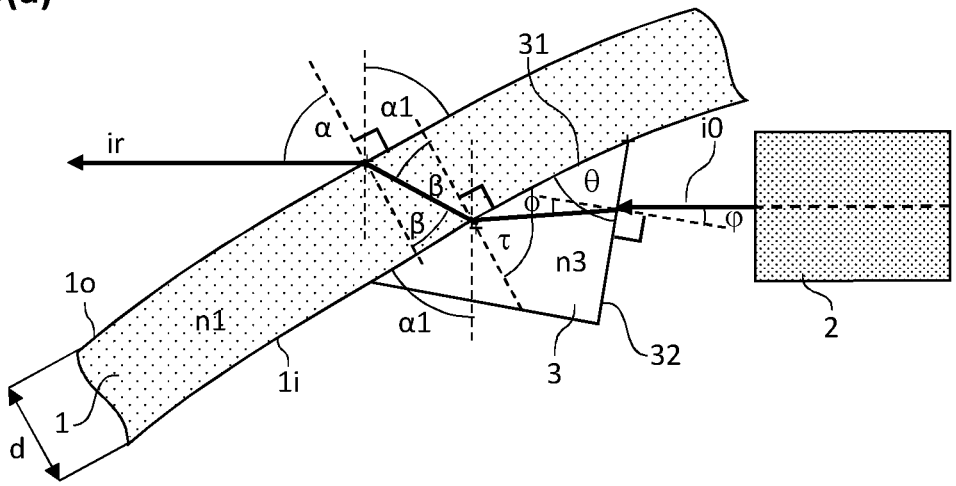
Figure 4A:
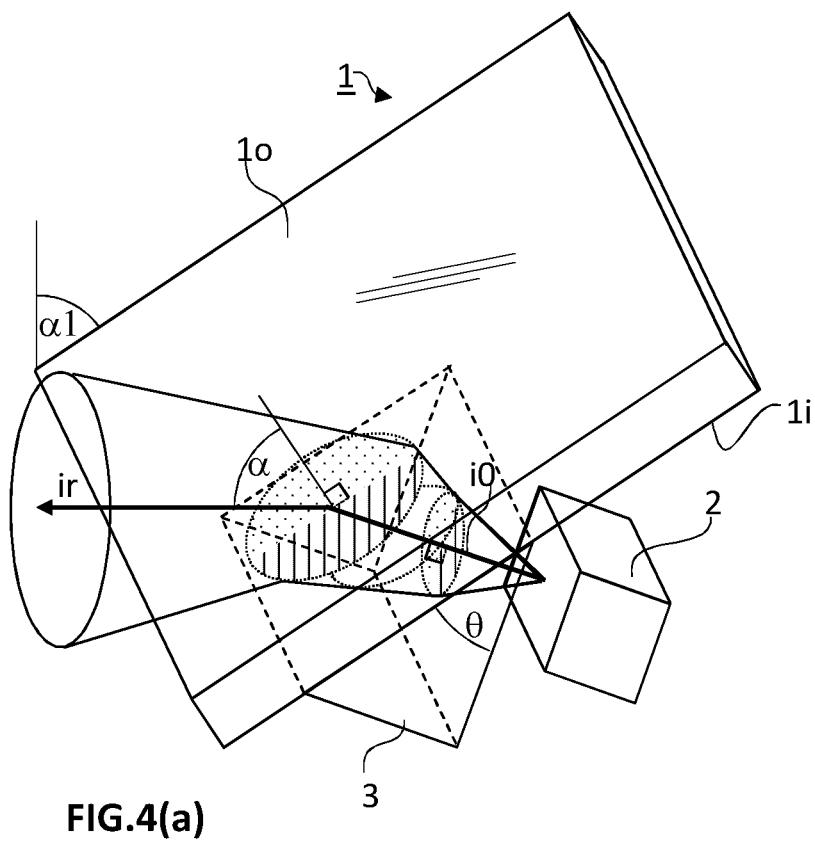
FIG. 4: shows an interior of an automotive vehicle provided with an assembly of a LiDAR device according to one embodiment of the present invention (a) perspective view, and (b) side cut view, showing the field of view (FOV).
Figure 4B:
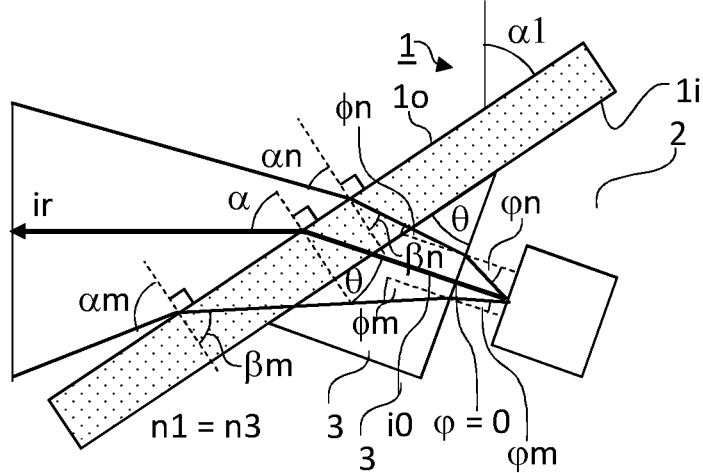
Figure 6A:
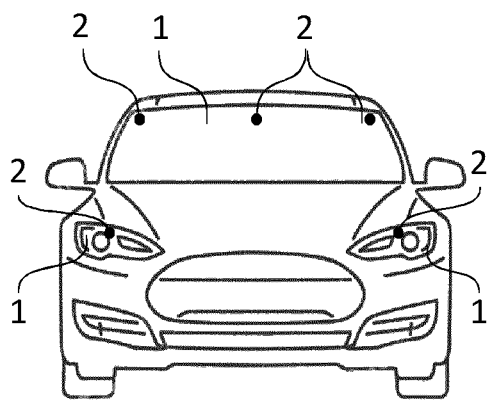
FIG. 6: shows an automotive vehicle comprising several solid-state LiDAR devices facing a pane, according to one embodiment of the present invention, forming an angle α1 with the vertical.
Figure 6B:
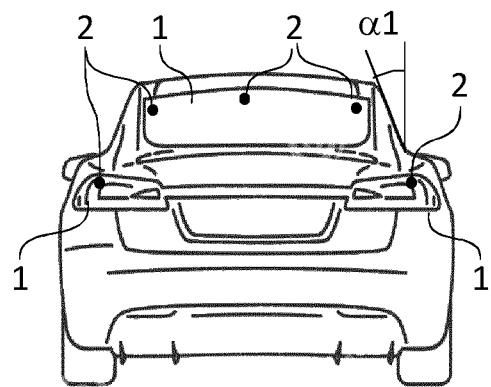
Figure 6C:
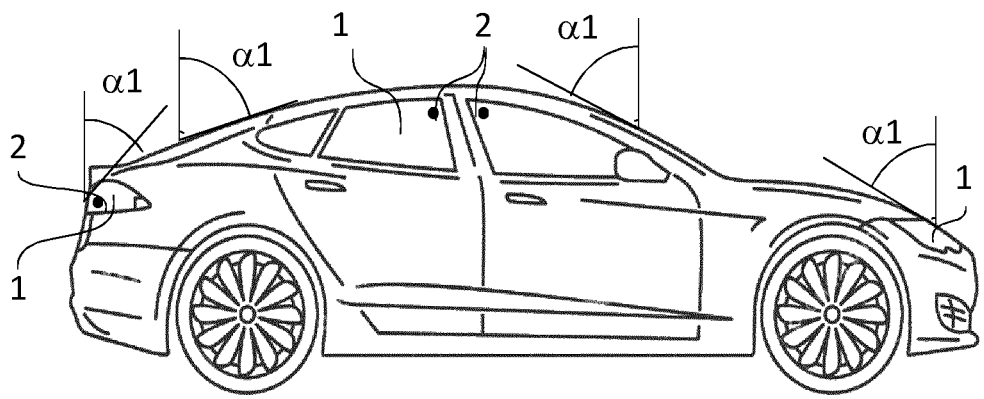

As illustrated in FIGS. 3, 4, and 6, the present invention concerns an automotive vehicle comprising a LiDAR and more particularly a solid-state Light Detection and Ranging (LiDAR) device (2) configured for emitting an IR beam centred on an incident axis (i0). Automotive vehicles include cars, vans, lorries, motor bikes, buses, trams, trains, airplanes, helicopter and the like. The LiDAR device is located in an interior environment of the vehicle, facing an inner surface (1$i$) of a transparent pane (1) of refractive index, n1 according to the invention and comprising an outer surface (1$o$) facing an exterior environment and separated from the inner surface (1$i$) by a thickness of the transparent pane (1). According to the present invention the pane may be transparent or opaque to light transmission according to the need of the glass (window or pillar) but having at an IR transparent portion for the location of the LiDAR device At least a portion of the transparent pane (1), in this particular case a light transparent pane (1), intersecting the radiations emitted by a LiDAR device, and more particularly a solid-state LiDAR (2) must be transparent at least to the infrared radiations (IR), in particular to the near infrared (NIR) radiations, with a mean absorption coefficient (k) in the wavelength range from 750 nm to 1650 nm lower than 5 m$^{-1}$ (i.e., k≤5 m$^{-1}$), preferably lower than 3 m$^{-1}$ (i.e., k≤3 m$^{-1}$), more preferably lower than 1 m$^{-1}$ (i.e., k≤1 m$^{-1}$). The inner surface (1$i$) of the transparent pane (1) forms a tilting angle α1 with a vertical direction larger than 10°(α1>10°), preferably larger than 50° and more preferably larger than 60° or 70°.

Figure 5:
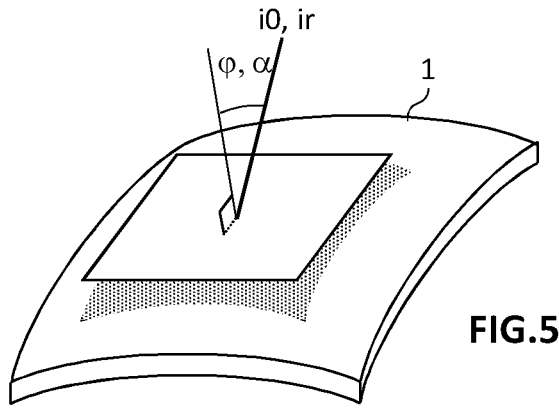
FIG. 5: shows how an angle between a radiation axis and a normal to a double-curvature surface is measured.

For sake of simplicity, the pane (1) is discussed in the following and is represented in the Figures with a substantially constant thickness (d1) (i.e., the inner and outer surfaces are parallel to one another) so the tilting angle α1 can also be measured on the outer surface (1o). This is representative of most transparent panes used in an automotive vehicle, but it is clear that there can be examples where such is not the case. For transparent panes having varying thicknesses, the discussion remains valid, but the tilting angle α1, is necessarily measured at the point of intersection of the incident axis (i0) with the inner surface (1o). As illustrated in FIG. 5, any angle formed by an axis with a curved surface is likely measured at the point of intersection of the axis with the curved surface, between the axis and the plane tangent to the curved surface at said point of intersection.

The LiDAR device is configured and mounted in the vehicle for emitting an IR beam centred on the incident axis (i0), intersecting the inner surface (1i) of the transparent pane (1) with an incident angle (φ+θ) to a normal to the inner surface (1i), passing through the transparent pane (1), and propagating in the exterior environment along a trajectory centred on a refracted axis (ir) forming an angle α with a normal to the outer surface (1o).

Figure 2:
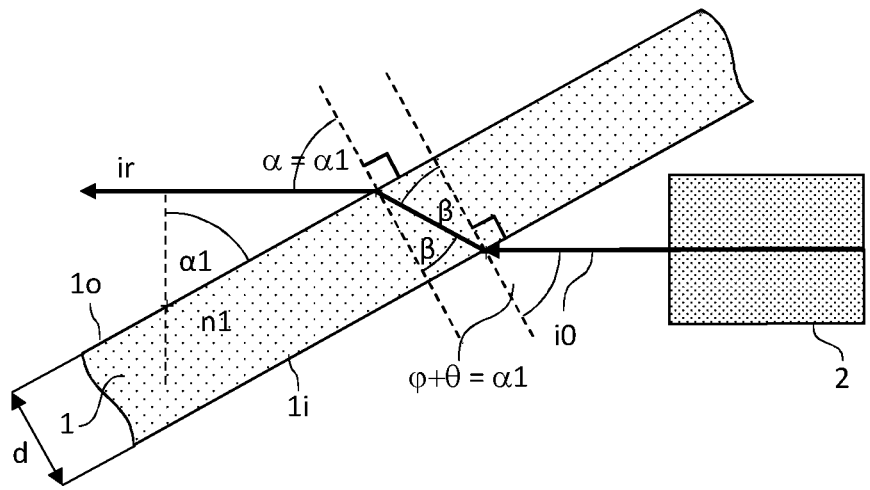
FIG. 2: shows an interior of an automotive vehicle provided with an assembly of a LiDAR device according to the prior art.

FIG. 2 illustrates an example of a LiDAR device mounted behind a transparent pane (1) (e.g., a windscreen) of a vehicle according to the prior art and configured for propagating an IR beam to the exterior environment along a trajectory centred on a horizontal refracted axis (ir) (i.e., pointing to the horizon). It is understood, that if the windshield is provided with a heated coating, then the portion wherein the LiDAR will be positioned is free of the said coating. Since the transparent pane (1) forms a tilting angle α1 with the vertical direction and since the refracted axis (ir) is horizontal, the latter forms with the outer surface of the transparent pane and angle α=α1. Taking account of the refractive index (n1) of the transparent pane, in order to achieve a refracted axis (ir) forming an angle α=α1 with the outer surface, the incident axis (i0) must form an incident angle (φ+θ)=α=α1.

Figure 1A:
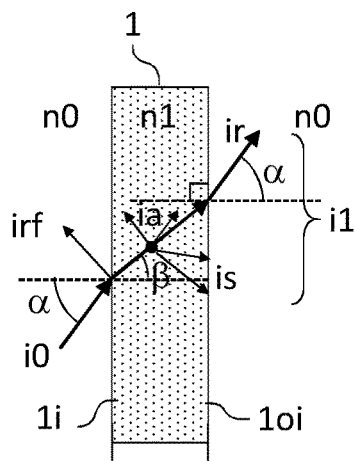
FIG. 1: illustrates (a) the behaviour of an incident radiation (i0) traversing a transparent wall portion of constant thickness, (b) the behaviour of an incident radiation (i0) traversing two transparent wall portions with parallel surfaces, (c) the behaviour of an incident radiation (i0) traversing a first transparent wall portion with non-parallel surfaces and a second transparent wall portion having parallel surfaces, (d) the fraction of an incident radiation reflected as a function of the incident angle φ (e) Fresnel reflectance as a function of the incident angle φ.
Figure 1B:
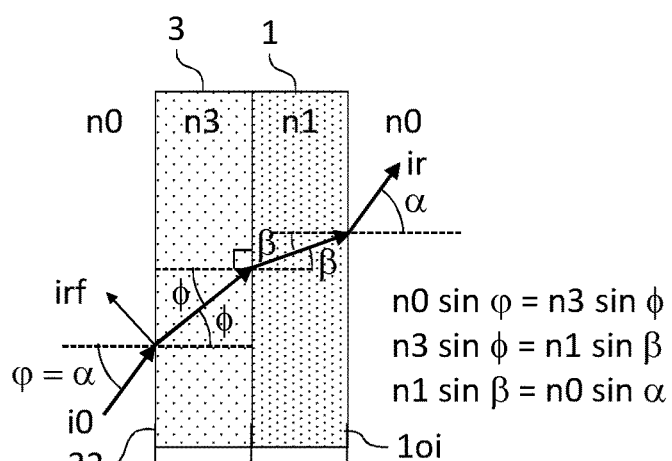
Figure 1C:
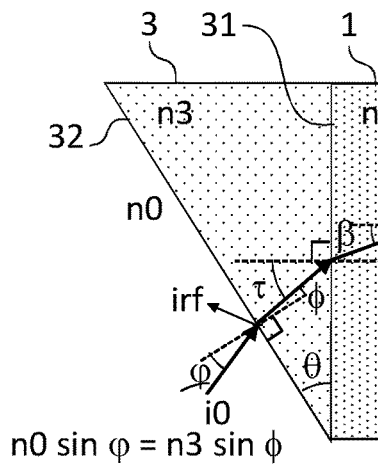
Figure 1D:
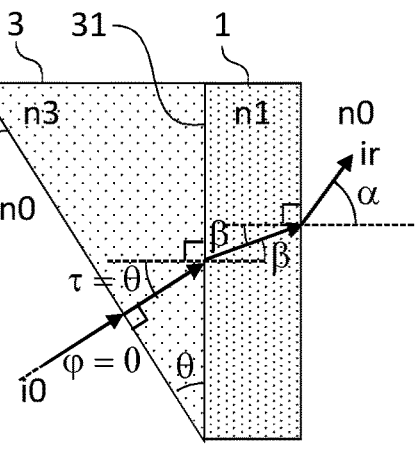
Figure 1E:
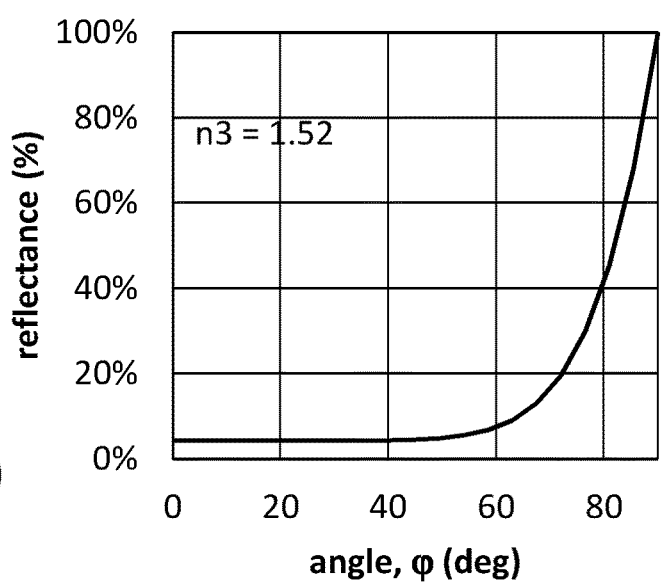

FIG. 1(e) plots the fraction of an incident radiation reflected by a surface of a transparent pane of refractive index n3>1) (=reflectance) as a function of the incident angle φ formed by the incident radiation with the surface, according to Fresnel law. It can be seen that the reflectance increases sharply for incident angles of the order of 50° and more. Considering that a windscreen can form a tilting angle α1 of the order of 60 to 70° depending on the design of the vehicle, the problem of reflectance becomes critical. High levels of reflectance are particularly critical for solid-state LiDAR's, resulting in a multitude of beams of low energy.

In order to reduce the reflectance of IR-radiations emitted by a LiDAR device (2) the present invention proposes coupling the LiDAR device (2) to the inner surface (1i) of the pane (1), for example a visible transparent pane, by means of an anti-reflection unit (3). The anti-reflection unit (3) is made of a material of refractive index, n3, and has a mean absorption coefficient (k) in the wavelength range from 750 nm to 1650 nm lower than 5 m$^{-1}$ (i.e., k≤5 m$^{-1}$), preferably lower than 3 m$^{-1}$ (i.e., k≤3 m$^{-1}$), more preferably lower than 1 m$^{-1}$ (i.e., k≤1 m$^{-1}$).

The anti-reflection unit (3) comprises an interfacial surface (31) coupled in intimate contact with the inner surface (1i) of the IR-transparent pane (1) and a surface (32) coupled to the LiDAR device (2). The surface (32) forms with the interfacial surface (31) a wedge angle θ. A normal to the surface (32) forms the angle φ, with the incident axis (i0), wherein φ is comprised between −30° and +30°, preferably between −10° and +10°, more preferably between −5° and +5°, and the angle φ is most preferably 0°, i.e., the incident axis (i0) is most preferably normal to the surface (32). The incident axis (i0) forms an angle (φ+θ) with the inner surface (1i) of the transparent pane. As discussed supra with respect to FIG. 2 illustrative of the prior art, for a horizontal refracted axis (ir), the incident angle φ between the incident axis (i0) and the inner surface (1i) is equal to the tilting angle α1 of the transparent pane (1) which, for a windscreen is typically of the order of 50 to 70°. By interposing the anti-reflection unit (3) between the LiDAR device (2) and the IR-transparent pane (1), the incident angle becomes simply (φ+θ)−θ=φ<(φ+θ). which is smaller than the incident angle (φ+θ)(=α1 for horizontal refracted axis (ir)), required absent an anti-reflection unit (3) (cf. FIG. 2). In a preferred embodiment, illustrated in FIGS. 3(c) to 3(e), the incident angle φ of the incident axis (i0) with the surface (32) is zero. Introducing and comparing in the reflectance curve of FIG. 1(e) an incident angle (φ+θ)=α1 ≈60 to 70° representative of the prior art and an incident angle φ<(φ+θ), preferably φ=0, representative of the present invention, shows how much the fraction of radiation reflected onto the surface (32) can be reduced, thus allowing a larger fraction of the infrared energy to be transmitted through the IR-transparent pane (1). This increases the efficacy of the data provided by the LiDAR device, with a higher definition and accuracy of the geometries and positions of obstacles detected within the field of view (FOV) of the LiDAR device.

Pane (1) and Interior Environment

An interior environment of a vehicle is any space separated from the exterior environment by a pane (1). For example, the interior environment can be the interior cabin of the vehicle and the transparent pane (1) or more preferably light transparent pane, can be the front windscreen, the rear window, or one or more side windows. The interior environment can also be the interior of a front or rear light unit, and the IR-transparent pane (1) can be the cover of the light unit.

The pane (1) has a refractive index, n1, and a mean absorption coefficient (k) in the wavelength range from 750 nm to 1650 nm lower than 5 m$^{-1}$ (i.e., k≤5 m$^{-1}$), preferably lower than 3 m$^{-1}$ (i.e., k≤3 m$^{-1}$), more preferably lower than 1 m$^{-1}$ (i.e., k≤1 m$^{-1}$). The refractive index n1 of the transparent pane is preferably comprised between 1.3 and 1.7, more preferably between 1.4 and 1.6 most preferably between 1.45 and 1.55.

The absorption coefficient (k) is defined as follows. The amount of radiation energy, I, transmitted through a transparent pane decreases geometrically with the thickness of the transparent pane. In (I/I0)=−k d, wherein I0 is the incident radiation energy, I is the transmitted radiation energy. d the thickness of the transparent pane traversed by the radiation, and k is defined as the absorption coefficient. A mean value of the absorption coefficient (k) is defined as the mean value of the absorption coefficients (k) measured over the whole range of wavelengths comprised between 750 and 1650 nm. If the LiDAR emits in a narrower range of wavelengths, it is clear that the mean absorption coefficient (k) can be measured over this narrower range only.

The whole transparent pane (1) needs not to have a mean absorption coefficient (k) in the wavelength range from 750 nm to 1650 nm lower than 5 m$^{-1}$ (i.e., k≤5 m$^{-1}$). It suffices that the portion of the transparent pane (1) intersecting the IR radiation emitted by the LiDAR have a low absorption coefficient (k). This is important in case the transparent pane is a windscreen. To reduce the heating of the interior cabin of a vehicle by the sun hitting through the windscreen, windscreens are often treated with an infrared filter layer. Such infrared filter layer is not desired in the area where the IR beam of the LiDAR device traverses the windscreen. It suffices to let that area free of an IR filter layer, to increase the transmission of IR radiations emitted by the LiDAR through the windscreen, and to apply an IR filter layer in the rest of the area of the windscreen to absorb the heat of the sun rays transmitted through the windscreen.

The inner surface (1i) of the transparent pane forms a tilting angle α1 with a vertical direction larger than 10° (α1>10°), generally larger than 50°, or 60° and even than 70°. In a preferred embodiment, the transparent pane (1) has a substantially constant thickness (d1), so that the inner surface (1i) is parallel to the outer surface (1o). This is the situation encountered in a vast majority of cases in an automotive vehicle and is the situation illustrated in the Figures.

The pane (1) can be a flat glass, or a glass having a single or double curvature. As illustrated in FIG. 5, an angle between an axis (ir, i0) and a surface selected between the inner surface (1i) and the outer surface (1o) of the transparent pane having a single or double curvature is measured with respect to a plane tangent to the surface at an intersection point between the axis and the surface.

As illustrated in FIG. 6, the pane (1) can be a front windscreen, a rear window, or a side window, all of them separating the exterior environment from the interior cabin of the vehicle. The pane can also be a cover of a front or rear light unit, or of a side light unit, separating the exterior environment from the interior volume of the light unit.

According to one embodiment of the present invention, the pane is a laminated pane. For safety reason, a laminated pane is required for a windshield for example. However, a laminated pane may be used for rear and side windows. Laminated glasses are more resistant to shattering upon impact. As shown schematically in FIGS. 7(a) & 7(d), laminated glass panes are obtained by laminated at least a first and second glass panes (11, 12) separated by at least one thermoplastic adhesive interlayer (1p). The adhesive interlayer (1p) may provide other functions than adhesion, by including one or more of an infrared absorber or reflector, ultraviolet absorber, antioxidant, light stabilizer, colorant, and the like, to filter undesired wavelengths, enhancing thermal insulation, tinting.

The first and second glass panes (11, 12) can be any glass pane used in the automotive industry.

Preferably, the base glass composition of the invention comprises a total content expressed in weight percentages of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base glass composition comprises according to the invention in a content, expressed as total weight of glass percentages:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

More preferably, for reasons of lower production costs, the at least one glass sheet according to the invention is made of soda-lime glass. Advantageously, according to this embodiment, the base glass composition comprises a content, expressed as the total weight of glass percentages:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

In addition to its basic composition, the glass may include other components, nature and adapted according to quantity of the desired effect.

A solution proposed in the invention to obtain a very transparent glass in the high infrared (IR), with weak or no impact on its aesthetic or its color, is to combine in the glass composition a low iron quantity and chromium in a range of specific contents.

Thus, according to a first embodiment, the glass sheet preferably has a composition which comprises a content, expressed as the total weight of glass percentages:

| | |
|---|---|
| Fe total (expressed as $Fe_2O_3$) | 0.002-0.06% |
| $Cr_2O_3$ | 0.0001-0.06%. |

Such glass compositions combining low levels of iron and chromium showed particularly good performance in terms of infrared reflection and show a high transparency in the visible and a little marked tint, near a glass called "extra-clear". These compositions are described in international applications WO2014128016A1, WO2014180679A1, WO2015011040A1, WO2015011041A1, WO2015011042A1, WO2015011043A1 and WO2015011044A1, incorporated by reference in the present application. According to this first particular embodiment, the composition preferably comprises a chromium content (expressed as Cr2O3) from 0.002 to 0.06% by weight relative to the total weight of the glass. Such contents of chromium it possible to further improve the infrared reflection.

According to a second embodiment, the glass sheet has a composition which comprises a content, expressed as the total weight of glass percentages:

| | |
|---|---|
| Fe total (expressed as Fe2O3) | 0.002-0.06% |
| Cr2O3 | 0.0015-1% |
| Co | 0.0001-1%. |

Such chromium and cobalt based glass compositions showed particularly good performance in terms of infrared reflection while offering interesting possibilities in terms of aesthetics/color (bluish neutrality to intense coloration even up opacity). Such compositions are described in European patent application No. 13 198 454.4, incorporated by reference herein.

According to a third embodiment, the glass sheets have a composition which comprises a content, expressed as the total weight of glass percentages:

| total iron (expressed as Fe2O3) | 0.02-1% |
|---|---|
| Cr2O3 | 0.002-0.5% |
| Co | 0.0001-0.5%. |

Preferably, according to this embodiment, the composition comprises: 0.06%<Total Iron≤1%.

Such compositions based on chromium and cobalt are used to obtain colored glass sheets in the blue-green range, comparable in terms of color and light transmission with blue and green glasses on the market, but with performances particularly good in terms of infrared reflection. Such compositions are described in European patent application EP15172780.7, and incorporated by reference into the present application.

According to a fourth embodiment, the glass sheet has a composition which comprises a content, expressed as the total weight of glass percentages:

| total iron (expressed as Fe2O3) | 0.002-1% |
|---|---|
| Cr2O3 | 0.001-0.5% |
| Co | 0.0001-0.5%. |
| Se | 0.0003-0.5%. |

Such glass compositions based on chromium, cobalt and selenium have shown particularly good performance in terms of infrared reflection, while offering interesting possibilities in terms of aesthetics/color (gray neutral to slight staining intense in the gray-bronze range). Such compositions are described in the application of European patent EP15172779.9, and incorporated by reference into the present application.

According to a first alternative embodiment, the glass sheet has a composition which comprises a content, expressed as the total weight of glass percentages:

| total iron (expressed as Fe2O3) | 0.002-0.06% |
|---|---|
| CeO2 | 0.001-1%. |

Such compositions are described in European patent application No. 13 193 345.9, incorporated by reference herein.

According to another alternative embodiment, the glass has a composition which comprises a content, expressed as the total weight of glass percentages:

| total iron (expressed as Fe2O3) | 0.002-0.06%; |
|---|---| and one of the following components:
manganese (calculated as MnO) in an amount ranging from 0.01 to 1% by weight;
antimony (expressed as Sb2O3), in an amount ranging from 0.01 to 1% by weight;
arsenic (expressed as As2O3), in an amount ranging from 0.01 to 1% by weight,
or
copper (expressed as CuO), in an amount ranging from 0.0002 to 0.1% by weight.

Such compositions are described in European patent application No. 14 167 942.3, incorporated by reference herein.

According to the present invention, the automotive glazing may be in the form of planar sheets. The glazing may be curved. This is usually the case for automotive glazing as for rear windows, side windows or roofs or especially windshields.

Such glass sheet has a very high transmittance to IR-radiations used by LiDARs detection devices in automotive vehicles. In case of a windshield, the windshield may be provided with at least one infrared absorption or reflection layer except in the area where the LiDAR is to be located.

For covers of front or rear light units, the pane (1) can be made of a transparent polymer or glass, having a composition, for example, as listed supra with respect to the windscreen.

LiDAR Device (2)

The present invention is not restricted to any particular LiDAR device type, provided it emits in a wavelength range comprised between 750 and 1650 nm. Solid-state LiDARs are preferred according to the present invention. Solid-state LiDARs are mounted on an electronic chip and have small dimensions. In one embodiment, it can be coupled to the surface (32) of the anti-reflection unit by means of an adhesive (e.g., a resin or a double-side adhesive tape) or by mechanical means, e.g., a cover clamping the chip into place.

The orientation of the refracted axis (ir) depends on the specific applications. In many applications, however, the refracted axis (ir) can be substantially horizontal, pointing to the horizon. The refracted axis (ir) forms an angle α with a normal to the outer surface (1o) of the transparent pane which can be comprised within ±5% of the tilting angle α1 of the transparent pane (i.e., α=α1 (1±5%)), preferably α=α1. In this case, the refracted axis (ir) is horizontal. As discussed supra, the tilting angle α1 of the transparent pane is preferably comprised between 50° and 70°.

Anti-Reflection Unit (3)

The anti-reflection unit (3) is made of a IR-transparent material of refractive index, n3. As for the pane (1), a "IR-transparent material" means a material having a mean absorption coefficient (k) in the wavelength range from 750 nm to 1650 nm lower than 5 m$^{-1}$ (i.e., k<5 m$^{-1}$), preferably lower than 3 m$^{-1}$ (i.e., k<3 m$^{-1}$), more preferably lower than 1 m$^{-1}$ (i.e., k<1 m$^{-1}$). The lower the value of the absorption coefficient, the higher the fraction of incident energy I0 is transmitted through the anti-reflection unit (3).

The interfacial surface (31) of the anti-reflection unit (3) is coupled in intimate contact with the inner surface (1i) of the IR-transparent pane (1) and the surface (32) is faced to the LiDAR device (2). The gist of the present invention is that the surface (32) forms with the interfacial surface (31) a wedge angle θ>0. The normal to the surface (32) at the point of intersection with the incident axis (i0) forms the angle φ<α1, with the incident axis (i0), wherein φ is comprised between 30° and +30° and is preferably zero. As illustrated in FIG. 3(c) an incident angle φ=0, i.e., incident axis (i0) is normal to the surface (32)), the radiation transmitted through the anti-reflection unit reaches the inner surface of the IR-transparent pane with the same angle θ as the wedge angle formed between the interfacial and surfaces (31, 32).

Referring to FIG. 1(a), an incident beam i0 propagating in the air (with a refractive index n0=1) and intersecting the inner surface (1*i*) of an IR-transparent pane of refractive index n1>n0, with an incident angle a, is deviated upon penetrating through the inner surface and through the transparent surface, forming an angle β, characterized by Snell' law, n0 sin α=n1 sin β. Upon reaching the outer surface (1*o*) of the IR-transparent pane (1), the beam is deviated again as it penetrates in the air. As Snell's law applies here too, it follows that the beam exits the IR-transparent pane with the same angle α as the incident angle α; This situation corresponds to the prior art assembly of a LiDAR simply fixed horizontally in front of an IR-transparent pane tilted with a tilting angle α1.

Referring to FIG. 1(*b*), if an intermediate pane (3) of constant thickness (d3) and of refractive index, n3>1, is intimately coupled to the IR-transparent pane (1) of constant thickness (d1), the incident beam first intersects a surface of the intermediate transparent pane with an incident angle φ, and is deviated as it crosses the intermediate transparent pane with an incident angle ϕ, until it reaches an interfacial surface forming an interface with the inner surface (1*i*) of the transparent pane. At this point, the beam is deviated with an angle β, until it reaches the outer surface (1*o*) and is deviated with an angle a as it propagates in the air. Applying Snell's law, it follows that the incident angle φ=α (n0 sin φ=n3 sin ϕ=n1 sin β=n0 sin α⇔φ=α).

Referring to FIG. 1(*c*), if the intermediate transparent pane is an anti-reflection unit (3) with the interfacial surface (31) forming a wedge angle θ with the surface (32) Snell's law applies too, but this time, φ<α. This situation corresponds to the configurations illustrated in FIGS. 3(*a*) and 3(*b*).

Referring to FIG. 1(*d*), if φ=0, such that the incident axis (i0) is normal to the surface (32) of the anti-reflection unit (3), the incident beam is not deviated upon crossing the surface (32), and reaches the interface between the interfacial surface (31) and the inner surface (1*i*) of the transparent pane with the same angle θ as the wedge angle formed between the interfacial surface (31) and surface (32). With φ=0, the incident axis (i0) forms with a normal to the interfacial surface (31) an angle τ, which is equal to the angle θ, (τ=θ). The wedge angle θ can easily be assessed as a function of the desired orientation of the refracted axis (ir) as, sin θ=(n0/n3) sin α, and with n0=1 for air, sin θ=(1/n3) sin α.

The wedge angle θ between the interfacial surface (31) and the surface (32) can be comprised between 10° and 50°, preferably between 30° and 40°, more preferably between 33° and 37°.

It can clearly be seen that with an anti-reflection unit comprising interfacial surface (31) and surface (32) forming a wedge angle θ, the incident angle φ can be reduced substantially compared with the angle α in the prior art vehicles as illustrated in FIG. 2 (φ<α), and can easily be set to φ=0, yielding the lowest reflectance as shown in the graph of FIG. 1(*e*). The interfacial surface (31) is not necessarily planar. It should mate as closely as possible the geometry of the portion of inner surface (1*i*) with which it forms an interface. If the inner surface (1*i*) is curved, as shown in FIG. 3(*b*) with a curved windshield and in FIG. 5, then the interfacial surface shall be curved to, such as to form together an intimate interface. An intimate interface is advantageous to enhance the transmission of the IR-radiation emitted by the LiDAR device (2).

Figure 7:
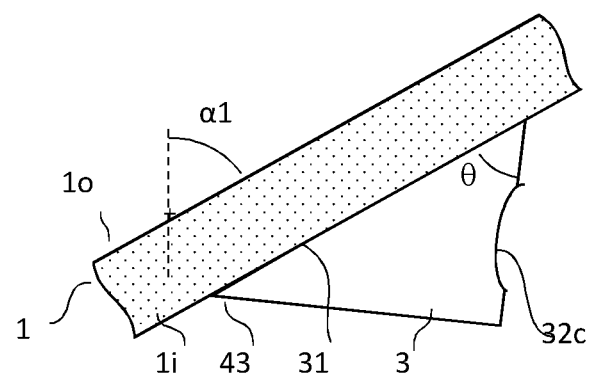
FIG. 7: shows one embodiment of assembly of an anti-reflection unit and a pane, which has non-flat surface 32.

Also the surface 32 may be not flat. Its shape can be designed to ensure normal incidence for each light beam. One example is illustrated in FIG. 7. Light beams from the detector all come from one point. The shape of surface 32 can have a concave surface with the point source as the center of the concave circle. If there are multiple point sources for the outwards light beams, or there are sensor points to collect backwards light beams, surface 32 can have multiple concave and/or convex profiles to be connected as one piece of components or to become separated components if needed. Furthermore, surface 32 can be designed to have freeform shape, so that the surface slope at each point is optimized to have normal incidence of light beams.

The shape of the anti-reflection unit (3) can be flexible, e.g. triangle, trapezoidal, and its upper and bottom boundary edges can be flexible as well, e.g. flat, rounded, as long as the interfacial surface (31) and the surface (32) forms an angle θ, in the way that the angle j between laser incident beam i0 and the normal of surface (32) is smaller than a1, preferably between −30 and 30 degrees, more preferably to be 0.

The anti-reflection unit (3) has a refractive index, n3. Preferably, the refractive index n3 of the anti-reflection unit is close to, more preferably equal to the refractive index n1 of the pane (1). In particular, n3 can be comprised within ±10% of n1 (i.e., n3=n1 (1±5%), preferably n3=n1. Both refractive indices n1 and n3 can be comprised between 1.3 and 1.7, preferably between 1.4 and 1.6 more preferably between 1.45 and 1.55. This embodiment has the advantage that the beam is not deviated at the interface between the anti-reflection unit (3) and the pane (1). In the embodiment of the incident angle φ=0, so that the beam propagates along the incident axis (i0) from its emission from the LiDAR device, and more particularly a solid-state LiDAR all the way through the outer surface of the outer surface (1*o*) of the transparent pane (1).

Figure 8:
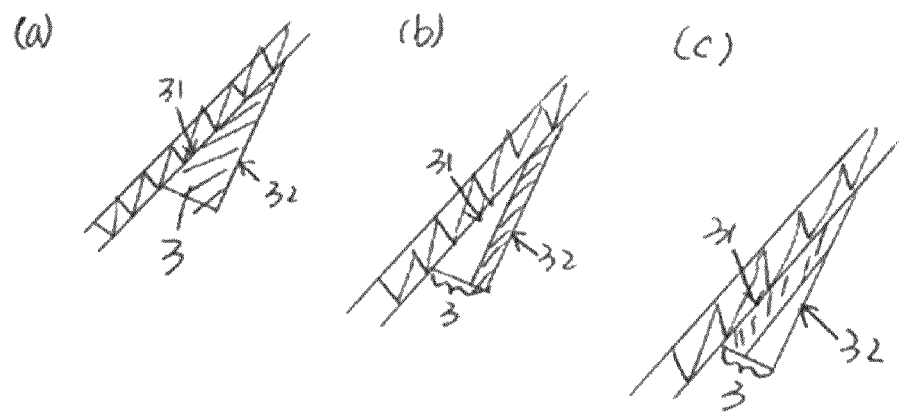
FIG. 8: shows three embodiments of assembly of an anti-reflection unit and a pane, of which the anti-reflection unit is fully (a) or partially (b)/(c) made of material with limited or low transmission to visible light.

The anti-reflection unit (3) can be made of glass or of polymer. Glass can be a soda lime glass, borosilicate glass, aluminosilicate glass or quartz glass. Polymers can be selected among one or more of polyvinyl butyral (PVB), polyurethane (PU), polymethyl methyl methacrylate (PMMA), polycarbonate (PC), optical grade silicone, or a blend or copolymer thereof, or a combination of two or more of the foregoing materials. The anti-reflection unit (3) can be monolithic, i.e., homogeneous and made of a single material or blend of materials, as discussed supra. Alternatively, it may be made of an assembly of various elements (3*i*) of same or different materials. In preferred embodiment of the present invention the anti-reflection unit (3) is opaque to visible light. the term opaque means that the light transmission is <10%. The FIG. 8 shows 3 configurations according to embodiments of the present invention: In FIG. 8(*a*), the Anti-reflective unit (3), is all made of near-IR (NIR) transparent but visible light opaque material. The AR-unit (3) may be made of black material, for example black-IR transparent glass as described in European patent application EP18194808.4. In FIGS. 8(*b*) and 8 (*c*), the AR unit (3) is partially made of an NIR transparent but visible opaque material. Thus, different types of material may be used to form the AR-unit (3). One of these materials is an NIR transparent and visible transparent material (here NIR transparent material), defined as having an absorption coefficient smaller than 5 $m^{-1}$ in the wavelength range from 750 nm to 1650 nm. NIR transparent and visible opaque material is defined both to have absorption coefficient smaller than 5 $m^{-1}$ in the wavelength range from 750 nm to 1650 nm and to have transmission smaller than 10% in the wavelength range from 400 nm to 750 nm, preferably smaller than 5%, more preferably smaller than 1%.

Regardless of the laminar or monolithic structure of the anti-reflection unit (3), the interfacial surface (31) and/or the surface (32) may be provided with additional functions such as coating or by adding functional materials in-between pane substrate and AR unit.

Coating is preferably chosen amongst an anti-Reflective (AR) coating, a tinted coating, a hydrophobic coating, anti-fog coating, anti-frost coating, and/or heated coating.

An AR coating is preferably provided on surface 32 of the AR unit. The AR coating further enhances the transmission at interested wavelengths. The AR coating may, for example, be a layer based on porous silica having a low refractive index or it may be composed of several layers (stack), in particular a stack of layers of dielectric material alternating layers having low and high refractive indexes and terminating in a layer having a low refractive index. The AR coating may, for example, be a layer based on refractive index gradient layer deposited for example by ion implantation technique. A textured surface may be also used. Etching or coating techniques may as well be used in order to avoid reflection. Preferably, the reflection of the treated surface would decrease from at least 1% within the concerned wavelength range.

A tinted coating means at least one IR transparent absorbing (tinted) and/or reflecting coating in order to hide the un-aesthetic element of the sensor from the outside while ensuring a good level of operating performances. This coating may, for example, be composed of at least one layer of a black film or a layer of black paint having no (or very low) transmission in the visible optical range but having a high transparency in the infrared range of interest for the application. Preferably, such coating would demonstrate a transmission value in the visible optical range of maximum 15%, and a transmission value in the wavelength range from 750 to 1650 nm of at least 85%. Such paint can be made of organic compounds that can achieve transmission<10% in the 400-750 nm. The tinted coating can also be a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition.

A hydrophobic coating can be, for example, composed of thin molecular layers of fluoropolymers that reduces the surface energy and provides self-clean ability, anti-stain properties and improved moisture resistance among other effects.

The heated coating preferably has a layer thickness of 0.1 µm to 15 µm particularly preferably 1 µm to 10 µm.

Functional materials in-between pane substrate and AR unit, may include black PVB and/or a heating system.

Black PVB can be used as an interlayer between pane substrate and AR unit. It is transparent in the interesting IR wavelengths but has a low transmission in the visible range, more particularly less than 5% in the 400-750 nm.

A heating system that allows the assembly to quickly defrost or defog when the external operating conditions are unfavorable. Such heating system can be composed of a network of conductive wires, or conductive patch directly applied on the glass surface where an adequate power supply can be applied. Optionally, the system can also comprise a temperature sensor for dynamically triggering the heating function in case of need.

As discussed in the Background Art section, standard anti-reflection coatings are normally optimized for normal incidence (i.e., incident angle φ=0), which are normally not suitable for use in a pane having a tilting angle α1>10° and generally of the order of 50 to 70° (or more) for automotive front windscreens or rear windows. With a preferred incident angle φ=0° between the incident axis (i0) and the surface (32), a standard anti-reflection coating can efficiently be applied onto the surface (32) of the anti-reflection unit (3). For example, an anti-reflection layer may include one of a low refractive index porous silica, or a laminate of several layers of dielectric material alternating layers having low and high refractive indices and terminating in a layer having a low refractive index, or mixtures thereof.

Coupling of the Anti-Reflection Unit (3) to Transparent Pane (1)

The anti-reflection unit (3) is coupled to the transparent pane (1) by forming an interface between the interfacial surface (31) and the inner surface (1i). The interface must be such as to disrupt as little as possible the trajectory of a radiation between the anti-reflection unit and the transparent pane. The anti-reflection unit can be coupled to the transparent pane by mechanical fastening means, by adhesive means, or by autoclaving or any suitable means.

Mechanical fastening means may comprise fastening elements located at a peripheral region of the interfacial surface (31), outside of the field-of-view of the LiDAR device. The fastening elements may comprise first elements bonded to the inner surface (1i) of the transparent pane by for example an adhesive, and complementary elements part of or fixed to the anti-reflection unit. The first and complementary elements preferably a reversible coupling and may include a snap-fit assembly, a bayonet or threaded assembly, and the like. The advantage of reversible fastening means is that the anti-reflection unit (3) can be removed and replaced or repaired in case of damage.

Adhesive means can include applying an adhesive layer in the form of a double-side adhesive tape or a resin layer, transparent to the infrared radiations, with an absorption coefficient (k) in the wavelength range from 750 nm to 1650 nm lower than 5 m$^{-1}$ (i.e., a≤5 m$^{-1}$). Examples of commercial PSA tapes which would be suitable for the invention if available as double-side adhesive tapes include Scotchgard™ (e.g., SGH6) and VentureShield™ (e.g., VS7510E) by 3M, and Profilon™ by Haverkamp. Examples of resins which can be used to bon the anti-reflection unit (3) to the transparent pane (1) include Infoverre™ commercialized by AGC. Resins can react and set by exposure to temperature, or to radiations such as UV light, and the like.

Any suitable and known autoclaving process may be used to couple the anti-reflection unit (3) to the pane.

A LiDAR device (2) can thus be coupled to a transparent pane (1) of an automotive vehicle for reducing reflectance of the emitted IR beam by applying the following steps,
(a) providing a pane (1) as described supra,
(b) providing a Light Detection and Ranging (LiDAR) device (2) as described supra configured for emitting an IR beam centred on an incident axis (i0),
(c) providing an anti-reflection unit (3) as described supra,
(d) coupling in intimate contact the interfacial surface (31) of the anti-reflection unit (3) to the inner surface (1i) of the transparent pane (1),
(e) coupling the LiDAR to the surface (32) of the anti-reflection unit (3), such that the incident axis (i0) forms with a normal to the surface (32) an angle φ comprised between −30° and +30°, The coupling operation must be performed such that an IR-radiation emitted by the LIDAR centred on the incident axis (i0) penetrates the anti-reflection unit (3) through the surface (32) with the incident angle φ and exits the transparent pane (1) through the outer surface (1o) along a trajectory centred on the refracted axis (ir) forming an angle α with a normal to the outer surface (1o) wherein α>φ.

The interfacial surface (31) of the anti-reflection unit (3) is preferably coupled to the inner surface (1i) of the transparent pane (1) by mechanical fastening elements, with an adhesive or by autoclaving, as discussed supra.

Optical Properties of the Anti-Reflection Unit (3)

The anti-reflection unit (3) when coupled to a pane (1) forming a tilting angle of at least 10° with the vertical, preferably of at least 50°, more preferably of at least 60 or 70°, preferably has good optical properties. For example, not more than 6% of the IR beam emitted by the LiDAR may be reflected by the surface (32) and by the interface between interfacial surface (31) and inner surface (1i). It is of course not desirable that the reduction of reflectance obtained by reducing the incident angle φ<α, be compensated, let alone surpassed by reflectance generated at the level of the interface between the interfacial surface (32) and the inner surface (1i). This can be achieved by selecting proper materials for the anti-reflection unit (3) and a proper coupling method as discussed supra.

The assembly formed by the interfacial surface (31) and the inner surface (1i) preferably has a mean transmittance of at least 85%, preferably at least 90%, more preferably at least 92%, and even of at least 95% to an IR-radiation in the wavelength range from 750 to 1650 nm.

The anti-reflection unit (3) does not need to have a high transparency to visible light. The anti-reflection unit (3) may be a silicate type glass sheet with a high near IR transmission, especially in the region 750-1650 nm, together with a very low or zero visible transmission while not deteriorating the resistance property of the sheet.

More particularly, the anti-reflection unit (3) is a silicate type glass sheet with a high near IR transmission, especially in the range 750-1650 nm, together with a very low or zero visible transmission, due to its intrinsic properties thereby without the need of an additional black/opaque layer/film.

The anti-reflection unit (3) may be to a glass sheet of silicate-type having a composition:
(i) comprising, in a content expressed as weight percentages, by total weight of glass:

| | |
|---|---|
| Total iron (expressed as $Fe_2O_3$) | 0.002-1.1%; |
| Manganese (expressed as MnO) | ≥0.005%; |
| and optionally, | |
| Chromium (expressed as $Cr_2O_3$) | 0-1.3%, | and
(ii) having:
the sum ($Fe_2O_3$+MnO+$Cr_2O_3$) of the contents of total iron, manganese and chromium, expressed as weight percentages, ≥1%
the ratio R1 defined as $Fe_2O_3*/(49+0.43(Cr_2O_3*-MnO*))<1$;
the ratio R2 defined as $Fe_2O_3*/(34+0.3(Cr_2O_3*-MnO*))<1$; $Fe_2O_3*$, MnO* and $Cr_2O_3*$ being relative percentages with respect to the sum ($Fe_2O_3$+MnO+$Cr_2O_3$).

One of the coupling or interfacial surfaces, or the bulk of the anti-reflection unit can be treated to be coloured, either by application of a coloured layer or dyed in the bulk of the releasable protective layer. For example, the releasable protective layer can be black or can have a colour matching the body colour of the vehicle it is applied to.

Most optical properties of materials are provided by the supplier's technical sheets.

Use of an Anti-Reflection Unit (3)

The present invention also concerns a use of an anti-reflection unit (3) as described supra for decreasing the amount of reflection of an IR-beam centred on an incident axis (i0) and emitted by a LiDAR device, more particularly a solid-state LiDAR, through a transparent pane (1) of an automotive vehicle forming an angle α1>10°, with the vertical, preferably α1>40°, more preferably α1>50° or 60°.

An assembly of a camera coupled to a windshield of a vehicle by means of a light guide body (="Lichtleitkörper") is described in WO2018087223. The light guide body is in the form of a wedge used for reducing the area (="Sensorbereich" or "Sensorfenster") on a sloped windscreen intersecting the field of vision of a camera facing the sloped windscreen. The teaching of WO2018087223 cannot be applied to the present invention for reducing the reflectance of an IR-beam emitted by LiDAR and more particularly a solid-state LiDARs through a sloped transparent pane for the following reasons. A camera does not emit any radiation, but captures visible light radiation coming from the external environment. Consequently, the visible radiations emitted by objects located in the external environment can be reflected by the outer surface (1o) of the windscreen. The use of an anti-reflection unit (3) according to the present invention is useful for reducing reflectance off the inner surface of the windscreen, emitted by the LiDAR, and would not solve the problem of reflection off the outer surface (1o) of visible light emitted from the external environment. Second, a camera has sufficient sensitivity to capture images from the outside in spite of a substantial amount of reflectance.

| REF # | Feature |
|---|---|
| 1 | Pane |
| 1i | Inner surface of the pane |
| 1o | Outer surface of the pane |
| 1p | Adhesive interlayer |
| 2 | LiDAR device |
| 3 | Anti-reflection unit |
| 3i | Elements forming an anti-reflection unit |
| 11 | First glass pane of laminate |
| 12 | Second glass pane of laminate |
| 31 | Interfacial surface of the anti-reflection unit |
| 32 | Surface of the anti-reflection unit |
| 32c | Lens |
| 41 | Adhesive interfacial layer |
| α | Angle between refracted axis (ir) and normal to outer surface of the pane |
| α1 | Angle of the pane with the vertical |
| β | Angle of transmission through the pane with normal thereto |
| φ | Angle between incident axis (i0) and surface (32) |
| ϕ | Angle of transmission through the anti-reflection unit |
| θ | Angle between interfacial surface (31) and surface (32) |
| τ | Angle between incident axis (i0) and normal to inner surface of the pane |
| ζ | = ½ π - τ |
| d | Thickness of pane traversed by a radiation |
| I | Transmitted radiation energy |
| i0 | Incident axis |
| I0 | Incident radiation energy |
| ir | Refracted axis |
| ia | Absorbed radiation |
| irf | Reflected radiation |
| is | Scattered radiation |
| k | Absorption coefficient |
| n0 | Refractive index of the outer environment (for air, n0 = 1) |
| n1 | Refractive index of the transparent pane |
| n3 | Refractive index of the anti-reflection unit |

The invention claimed is:

1. An automotive vehicle, comprising:
   (a) a pane having a refractive index, n1, and
      comprising an inner surface facing an interior environment and an outer surface facing an exterior environment,
      having at least one portion with a mean absorption coefficient (k) in a wavelength range from 750 nm to 1650 nm lower than 5 m−1 (i.e., a≤5 m−1), and wherein,
      the inner surface of the transparent pane forms a tilting angle α1 with a vertical direction larger than 10° (a1>) 10°;
   (b) a Light Detection and Ranging (LiDAR) device located in the interior environment and facing the inner surface, configured for emitting an IR beam centred on an incident axis (i0) forming an angle (φ+θ) with a normal to the inner surface, passing through the transparent pane, and propagating in the exterior environment along a trajectory centred on a refracted axis (ir) forming an angle a with a normal to the outer surface; and
   (c) an anti-reflection unit,
      made of a material of refractive index, n3, coupling the LiDAR device to the inner surface of the transparent pane,
      having a mean absorption coefficient (k) in a wavelength range from 750 nm to 1650 nm lower than 5 m−1 (i.e., k≤5 m−1),
      comprising an interfacial surface coupled in intimate contact with the inner surface of the transparent pane and
      comprising a first surface coupled to the LiDAR device, forming the angle θ with the interfacial surface and which normal forms the angle φ, with the incident axis, wherein φ is between −30° and +30°.

2. The automotive vehicle according to claim 1, wherein,
   the angle φ between a normal to the first surface and the incident axis is zero (φ=0), and
   the incident axis (i0) forms with a normal to the interfacial surface an angle t, which is equal to the angle θ (τ=θ), and
   sin θ=(1/n3) sin α.

3. The automotive vehicle according to claim 1, wherein n3 is within ±5% of n1 (i.e., n3=n1 (1±5%).

4. The automotive vehicle according to claim 1, wherein the refracted axis (ir) is substantially horizontal with a comprised within ±5% of α1 (i.e., α=α1(1±5%)).

5. The automotive vehicle according to claim 4, wherein the angle θ between the interfacial surface and the first surface is between 10° and 50°.

6. The automotive vehicle according to claim 1, wherein not more than 6% of the IR beam emitted by the LiDAR is reflected by the first surface and by an interface between the interfacial surface and the inner surface.

7. The automotive vehicle according to claim 1, wherein the anti-reflection unit is made of a material selected from the group consisting of glass, polyvinyl butyral (PVB), polyurethane (PU), polymethyl methyl methacrylate (PMMA), polycarbonate (PC), optical grade silicone, and a combination of two or more of the foregoing materials.

8. The automotive vehicle according to claim 1, wherein the anti-reflection unit is made of a silicate type glass sheet with a high near IR transmission in the region 750-1650 nm, together with a very low or zero visible transmission.

9. The automotive vehicle according to claim 1, wherein the pane is made of glass and wherein the transparent pane forms one of a windshield, back lite, front lite, or side lite of the automotive vehicle.

10. The automotive vehicle according to claim 1, wherein the pane is either,
   a flat glass, or
   a glass having a single or double curvature and wherein an angle between an axis (ir, i0) and a surface selected between the inner surface and the outer surface of the transparent pane is measured with respect to a plane tangent to the surface at an intersection point between the axis and the surface.

11. The automotive vehicle according to claim 1, wherein the pane is provided with an infra-red filter, except in an area in contact with the interfacial surface of the anti-reflection unit.

12. The automotive vehicle according to claim 1, wherein the interfacial surface and/or the first surface may be coated with an anti-frost treatment, an anti-reflection coating, a hydrophobic coating and/or a black tinted coating absorbing part or all of the visible light.

13. A process for coupling a LiDAR device to a pane comprising:
   (a) providing the pane having a refractive index, n1, and comprising an inner surface and an outer surface separated from the inner surface by a thickness, and having a mean absorption coefficient (k) in the wavelength range from 750 nm to 1650 nm lower than 5 m$^{-1}$ (i.e., a≤5 m$^{-1}$),
   (b) providing a LiDAR device configured for emitting an IR beam centred on an incident axis (i0),
   (c) providing an anti-reflection unit made of a material of refractive index, n3, and having a mean absorption coefficient (k) in the wavelength range from 750 nm to 1650 nm lower than 5 m−1 (i.e., k≤5 m−1), the anti-reflection unit comprising an interfacial surface and a first surface forming an angle θ with the interfacial surface,
   (d) coupling in intimate contact the interfacial surface of the anti-reflection unit to the inner surface of the pane, and
   (e) coupling the LiDAR to the surface of the anti-reflection unit, such that the incident axis (i0) forms with a normal to the first surface an angle φ between 30° and ±30°,
   such that an IR-radiation emitted by the LiDAR centred on the incident axis (i0) penetrates the anti-reflection unit through the first surface with the incident angle φ and exits the IR-transparent pane through the outer surface along a trajectory centred on a refracted axis (ir) forming an angle a with a normal to the outer surface wherein α>φ.

14. The process according to claim 13, wherein the anti-reflection unit is made of a silicate type glass sheet with a high near IR transmission in the region 750-1650 nm together with a very low or zero visible transmission.

15. The process according to claim 13, wherein the LiDAR is a solid-state LiDAR.

16. The automotive vehicle according to claim 1, wherein n1 and n3 are both between 1.3 and 1.7.

17. The automotive vehicle according to claim 4, wherein α1 is between 50° and 70°.

18. The automotive vehicle according to claim 4, wherein the angle θ between the interfacial surface and the first surface is between 30° and 40°.

19. The automotive vehicle according to claim 1, wherein the pane is made of laminated or tempered glass.

20. The automotive vehicle according to claim 1, wherein the first surface is coated with an anti-reflection coating.

\* \* \* \* \*